United States Patent
Dash

(10) Patent No.: US 11,640,382 B2
(45) Date of Patent: May 2, 2023

(54) OPTIMIZING DATABASE PERFORMANCE THROUGH INTELLIGENT DATA PARTITIONING ORCHESTRATION

(71) Applicant: BANK OF AMERICA CORPORATION, Charlotte, NC (US)

(72) Inventor: Bikash Dash, Telangada (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 215 days.

(21) Appl. No.: 17/141,680

(22) Filed: Jan. 5, 2021

(65) Prior Publication Data

US 2022/0215010 A1 Jul. 7, 2022

(51) Int. Cl.
| | |
|---|---|
| G06F 16/22 | (2019.01) |
| G06F 16/2455 | (2019.01) |
| G06F 11/34 | (2006.01) |
| G06F 16/2457 | (2019.01) |
| G06F 18/22 | (2023.01) |

(52) U.S. Cl.
CPC ...... *G06F 16/2282* (2019.01); *G06F 11/3409* (2013.01); *G06F 16/24554* (2019.01); *G06F 16/24573* (2019.01); *G06F 18/22* (2023.01)

(58) Field of Classification Search
CPC .................................................. G06F 16/2282
USPC ........................................................ 707/752
See application file for complete search history.

(56) References Cited

U.S. PATENT DOCUMENTS

| | | | |
|---|---|---|---|
| 9,104,707 B1* | 8/2015 | Allen | G06F 16/316 |
| 2004/0186846 A1* | 9/2004 | Birdwell | G16B 50/20 |
| 2006/0173938 A1* | 8/2006 | Banzon | G06F 9/5066 |
| 2008/0320244 A1* | 12/2008 | Shen | G06F 16/9017 |
| | | | 707/E17.037 |
| 2016/0112531 A1* | 4/2016 | Milton | G06F 16/24556 |
| | | | 709/205 |
| 2016/0147778 A1* | 5/2016 | Schreter | G06F 16/2358 |
| | | | 707/674 |
| 2016/0350671 A1 | 12/2016 | Morris, II et al. | |
| 2018/0046926 A1 | 2/2018 | Achin et al. | |
| 2018/0096000 A1* | 4/2018 | Harrison | G06F 16/288 |
| 2018/0203916 A1* | 7/2018 | Rafsky | G06F 16/285 |
| 2020/0125666 A1* | 4/2020 | Eadon | G06F 16/24557 |
| 2020/0334222 A1* | 10/2020 | Yan | G06F 16/2282 |

* cited by examiner

*Primary Examiner* — Muluemebet Gurmu
(74) *Attorney, Agent, or Firm* — Moore & Van Allen PLLC; James C. Edwards

(57) ABSTRACT

Intelligent analysis and prognosis-based data partitioning orchestration for optimizing database performance. Partitioning is not limited to partitioning keys established solely based on the columns of the table being partitioned, rather analysis is undertaken on dependent tables and the past behavior of fundamental data elements in the database is assessed as a means for determining the most optimal partitioning scheme. Thus, relevant information and values in the table being partitioned, as well as dependent tables and the fundamental data elements is used to determine how likely each record/row in the table is to be subjected to a data manipulation operation. The likelihood of a data manipulation operation being performed on each record serves as the basis for assigning the record to one of a plurality of partitions.

17 Claims, 9 Drawing Sheets

OPTIMIZING DATABASE PERFORMANCE THROUGH INTELLIGENT DATA PARTITIONING ORCHESTRATION

FIELD OF THE INVENTION

The present invention relates to database management and, more specifically, optimizing database performance through intelligent data partitioning orchestration.

BACKGROUND

Data, specifically data that is stored in a database, is constantly becoming more complex and more voluminous. Partitioning data within a database provides a means for conducting Data Manipulation Language (DML) operations, such as data retrieval and the like, in a faster and more efficient manner. Traditionally, partitioning has been performed based on partitioning keys established on a column (s) in the database. However, as data becomes more complex and the number of columns in a database table increase, it becomes increasingly more difficult to determine which column(s) should be considered for partitioning (i.e., which column or columns in the database provide for optimized partitioning). Further, traditional partitioning fails to take into account behavior and dependencies of related data elements and key data elements of the database when making partitioning decisions. In this regard, situations may arise where critical data is not provided for by a column in the table experiencing performance issues; however, such critical data may be provided within a dependent table. Moreover, if the partitioning of a table is less than optimal, not only will DML operation inefficiencies prevail, but other performance issues may result due to the need for subsequent partition switching.

Therefore, a need exists to develop systems, methods, computer program products and the like that provide for intelligent data partitioning orchestration within a database so as to optimize overall database performance. In this regard, desired systems, methods, computer program products and the like should not be limited by traditional partitioning keys that are solely established based on columns in the table being partitioned. As a result, the desired systems, methods, computer program products of the like should allow for databases storing large volumes of complex data to be intelligently partitioned for purposes of addressing database performance issues and minimizing the effects of partition switching.

SUMMARY OF THE INVENTION

The following presents a simplified summary of one or more embodiments in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for intelligent analysis and prognosis-based data partitioning orchestration for optimizing database performance. Unlike traditional partitioning mechanisms that are limited to partitioning keys established solely based on the columns of the table being partitioned, the present invention relies on analysis of dependent tables and the past behavior of fundamental data elements in the database as a means for determining how likely each record/row in the table is to be subjected to a data manipulation operation, such as data retrieval or any other operation performed on the record/row. The determination of how likely each record/row in the table is to be subjected to a data manipulation operation forms the criteria for partitioning, such that, in specific embodiments, data records that are more likely to be subjected to a data manipulation operation are moved to one partition, while data records that are less likely to be subjected to a data manipulation operation and moved to another partition.

Moreover, the present invention provides for systematically scheduling partitioning (i) re-assessment of previously partitioned data, and (ii) determination of partition assignment for new records according to the aforementioned intelligent data partitioning orchestration, such that data movement among partitions occurs seamlessly (i.e., avoiding partition switching while the database is undergoing data manipulation operations).

Further, embodiments of the present invention provide for partitioning to occur absent the need for a clearly defined partitioning key.

Thus, the present invention allows the user to input/communicate their authentication credentials to apparatus requiring such without having to contact the input mechanism on the apparatus or the display on their respective user communication device.

A system for intelligent database partitioning defines first embodiments of the invention. The system includes a database including a plurality of tables. Each table including a plurality of columns and a plurality of records. The plurality of tables includes one or more fundamental tables comprising fundamental data elements. The system additionally includes a computing platform having a memory and one or processing devices in communication with the memory.

Further, the system includes a data partitioning orchestration engine that is stored in the memory, and executable by the one or more processing devices. The Engine is configured to identify at least one of the plurality of tables for data partitioning, and determine, for each record in the at least one identified table, a measurement, such as a Database Manipulation Language (DML) score or the like, that indicates a likeliness that the record is to be subjected to a data manipulation operation, such as data retrieval or the like. Unlike conventional partitioning mechanisms, which rely only on information from the columns of table itself in determining how to partition, the measurement of the present invention is based at least on analyzing (i) first metadata and values associated with the columns of the identified table, (ii) second metadata and values associated with columns of dependent tables related to the identified table, and (iii) third metadata and values associated with the fundamental data elements of the one or more fundamental tables. The engine is further configured to partition, each record in the at least one identified table, into one of a plurality of partitions based on the measurement of the likeliness that the record is to be subjected to a data manipulation operation. For example, in those embodiments of the invention in which the records are partitioned into two partitions, first records having a measurement/score above a request threshold may be partitioned into a first partition (i.e., records more likely to be subject to a data manipulation operation) and second records having a measurement/score below the request threshold may be partitioned into a second partition (i.e., records less likely to be subject to a data manipulation operation).

In specific embodiments of the system, the data partitioning orchestration engine is further configured to be executed on a first schedule (e.g., a comprehensive schedule) that is configured to, for each subsequent execution after a first execution, determine, for each record in the at least one identified table, an updated measurement of the likeliness that the record is to be subjected to a data manipulation operation, and determine whether each of the records in the at least one identified table should remain in their respective current partition or be re-assigned to a different partition based on the updated measurement of the likeliness that the record is to be subjected to a data manipulation operation. The first schedule facilitates partition refresh mechanisms and avoids partition switching of records. In related embodiments of the system, the data partitioning orchestration engine is further configured to be executed on a second schedule (e.g., an abbreviated schedule) that is configured to determine, for each new record having been entered into the table since a preceding execution, the measurement of the likeliness that the new record is to be subjected to a data manipulation operation, and partition each new record into one of the plurality of partitions based on the measurement of the likeliness that the new record is to be subjected to a data manipulation operation. In such embodiments of the second schedule is configured for execution more frequently than the first schedule. In other related embodiments of the system, the data partitioning orchestration engine is further configured to determine the time interval/period for execution of the first and second schedules based at least on one or more of (i) a volume of records in the identified table, (ii) a volume of new records in the identified table, and (iii) a volume of query transactions logged for the database.

In other specific embodiments of the system the data partitioning orchestration engine is further configured to, in response to identifying the tables, add an additional column to the at least one identified table that is configured to store the measurement of the likeliness that the record is to be subjected to a data manipulation operation.

In further specific embodiments of the system, the data partitioning orchestration engine is further configured to determine a quantity of the plurality of partitions based at least on a quantity of records in the table and a variance amongst the measurements of each of the records in the table.

In additional specific embodiments of the system, the data partitioning orchestration engine is further configured to insert new records entered into a designated partition from amongst the plurality of partitions. In such embodiments, the designated partition is configured to store only new records that have not yet undergone a determination of the measurement. In such embodiments of the system, the engine looks to the designated partition to identify new records when executing the second/abbreviated schedule.

In still further specific embodiments of the system, the data partitioning orchestration engine is further configured to determine the measurement by (a) identifying a plurality of key-value pairs defined by (i) a column of the identified table, one of the dependent tables or one of the fundamental tables, and (ii) and a corresponding column value or predetermined time period range, (b) analyzing, over time, one or more historical transaction logs associated with the database to determine a level impact that each of the key-value pairs has on queries executed on the database, (c) assigning a weighting to each of the key-value pairs based on the level of impact that the corresponding key-value pair has on the queries executed on the database, and (d) determining the measurement for each record based on the column values and key-value pair weightings. In such embodiments of the system, the data partitioning orchestration engine is further configured to identify the plurality of key-value pairs by (a) analyzing column values to determine which columns in the identified table, the one or more dependent tables and the one or more fundamental table include column values having a variance below a predetermined variance limit and (b) grouping time-specific columns according to time period ranges. The time period ranges are determined based on a volume of records in a corresponding table. First value pairs being defined by (i) a column including column values having the variance below the predetermined variance limit, and (ii) the corresponding column value, and second value pairs being defined by (i) a time-specific column, and (ii) the corresponding grouping. Further, key-value pairs are identified by (c) executing a clustering algorithm on the first and second value pairs to form clusters of value pairs and determining which value pair from amongst each of value pairs forming a cluster is a mutually exclusive subset of the cluster. The value pair that is the mutually exclusive subset of the cluster defines a key-value pair. In related embodiments of the system, the data partitioning orchestration engine is further configured to identify the plurality of key-value pairs by eliminating columns from key-value pair consideration based on a predetermined data size limit for values stored in a column.

In other related embodiments of the system, the data partitioning orchestration engine is further configured to analyze anomalies by determining one or more patterns in data manipulation operations from data stored in at least one of the plurality partitions (e.g., a data partition with records that are less/least likely to be subjected to a data manipulation operation) and analyzing the one or more patterns to determine whether the one or more patterns match a key-value pair. If at least one of the one or more patterns match a key-value pair, the engine is configured to adjust the impact score for the key-value pair, and, if the one or more patterns do not match a key-value pair, identify a new key-value pair and assign an impact score to the new key-value pair.

A computer-implemented method for intelligent database partitioning defines second embodiments of the invention. The method is executed by one or more computing processor devices. The method includes identifying at least one of a plurality of tables in a database for data partitioning. The method further includes determining, for each record in the at least one identified table, a measurement of a likeliness that the record is to be subjected to a data manipulation operation. The measurement, such as database manipulation language (DML) score or the like, is based at least on analyzing (i) first metadata and values associated with columns of the identified table, (ii) second metadata and values associated with columns of dependent tables related to the identified table, and (iii) third metadata and values associated with fundamental data elements of database. The method further includes partitioning, each record in the at least one identified table, into one of a plurality of partitions based on the measurement of the likeliness that the record is to be subjected to a data manipulation operation.

In specific embodiments the computer-implemented method further includes determining, on a first schedule, for each record in the at least one identified table, an updated measurement of the likeliness that the record is to be subjected to a data manipulation operation and determining whether each of the records in the at least one identified table should remain in their respective current partition or be re-assigned to a different partition based on the updated measurement of the likeliness that the record is to be subjected to a data manipulation operation. The first schedule facilitates partition refresh mechanisms and avoids partition switching of records. In related specific embodiments the computer-implemented method further includes determining, on a second schedule, for each new record entered into the at least one identified table, the measurement of the likeliness that the new record is to be subjected to a data manipulation operation, and partitioning each new record into one of the plurality of partitions based on the measurement of the likeliness that the new record is to be subjected to a data manipulation operation. In such embodiments of the method, the second schedule is based on a shorter time period than the first schedule.

In other specific embodiments the computer-implemented method further includes, in response to identifying the at least one of a plurality of tables in a database for data partitioning, adding an additional column to the at least one identified table. The additional column is configured to store the measurement of the likeliness that the record is to be subjected to a data manipulation operation.

In other specific embodiments the computer-implemented method further includes inserting new records entered into a designated partition from amongst the plurality of partitions. The designated partition is configured to store only new records that have not yet undergone a determination of the measurement.

A computer program product including a non-transitory computer-readable medium defines third embodiments of the invention. The computer-readable medium includes a first set of codes for causing a computer to identify at least one of a plurality of tables in a database for data partitioning. Further, the computer-readable medium includes a second set of codes for causing a computer to determine, for each record in the at least one identified table, a measurement of a likeliness that the record is to be subjected to a data manipulation operation. The measurement/score is based at least on analyzing (i) first metadata and values associated with columns of the identified table, (ii) second metadata and values associated with columns of dependent tables related to the identified table, and (iii) third metadata and values associated with fundamental data elements of database. In addition, the method includes a third set of codes for causing a computer to partition, each record in the at least one identified table, into one of a plurality of partitions based on the measurement of the likeliness that the record is to be subjected to a data manipulation operation.

In further specific embodiments of the computer program product, the computer-readable medium further includes a fourth set of codes for causing a computer to determine, on a first schedule, for each record in the at least one identified table, an updated measurement of the likeliness that the record is to be subjected to a data manipulation operation, and a fifth set of codes for causing a computer to determine whether each of the records in the at least one identified table should remain in their respective current partition or be re-assigned to a different partition based on the updated measurement of the likeliness that the record is to be subjected to a data manipulation operation. The first schedule facilitates partition refresh mechanisms and avoids partition switching of records. In related embodiments of the computer program product, the computer-readable medium further includes a sixth set of codes for causing a computer to determine, on a second schedule, for each new record entered into the at least one identified table, the measurement of the likeliness that the new record is to be subjected to a data manipulation operation, and a seventh set of codes for causing a computer to partition each new record into one of the plurality of partitions based on the measurement of the likeliness that the new record is to be subjected to a data manipulation operation. In such embodiments of the computer program product the second schedule is based on a shorter time period than the first schedule.

In other specific embodiments of the computer program product, the computer-readable medium further includes a fifth set of codes for causing the computer to, in response to identifying the at least one of a plurality of tables in a database for data partitioning, add an additional column to the at least one identified table. The additional column is configured to store the measurement of the likeliness that the record is to be subjected to a data manipulation operation.

Thus, systems, apparatus, methods, and computer program products herein described in detail below provide for intelligent analysis and prognosis-based data partitioning orchestration for optimizing database performance. The invention does not limit partitioning based solely on data in the table itself (i.e., partitioning keys established on columns of the table being partitioned). Instead the invention further relies on analysis of dependent tables and the past behavior of fundamental data elements in the database as a means for determining how likely each record/row in the table is to be subjected to a data manipulation operation, such as data retrieval or any other operation performed on the record/row. The determination of how likely each record/row in the table is to be subjected to a data manipulation operation forms the criteria for partitioning.

BRIEF DESCRIPTION OF THE DRAWINGS

Figure 1:
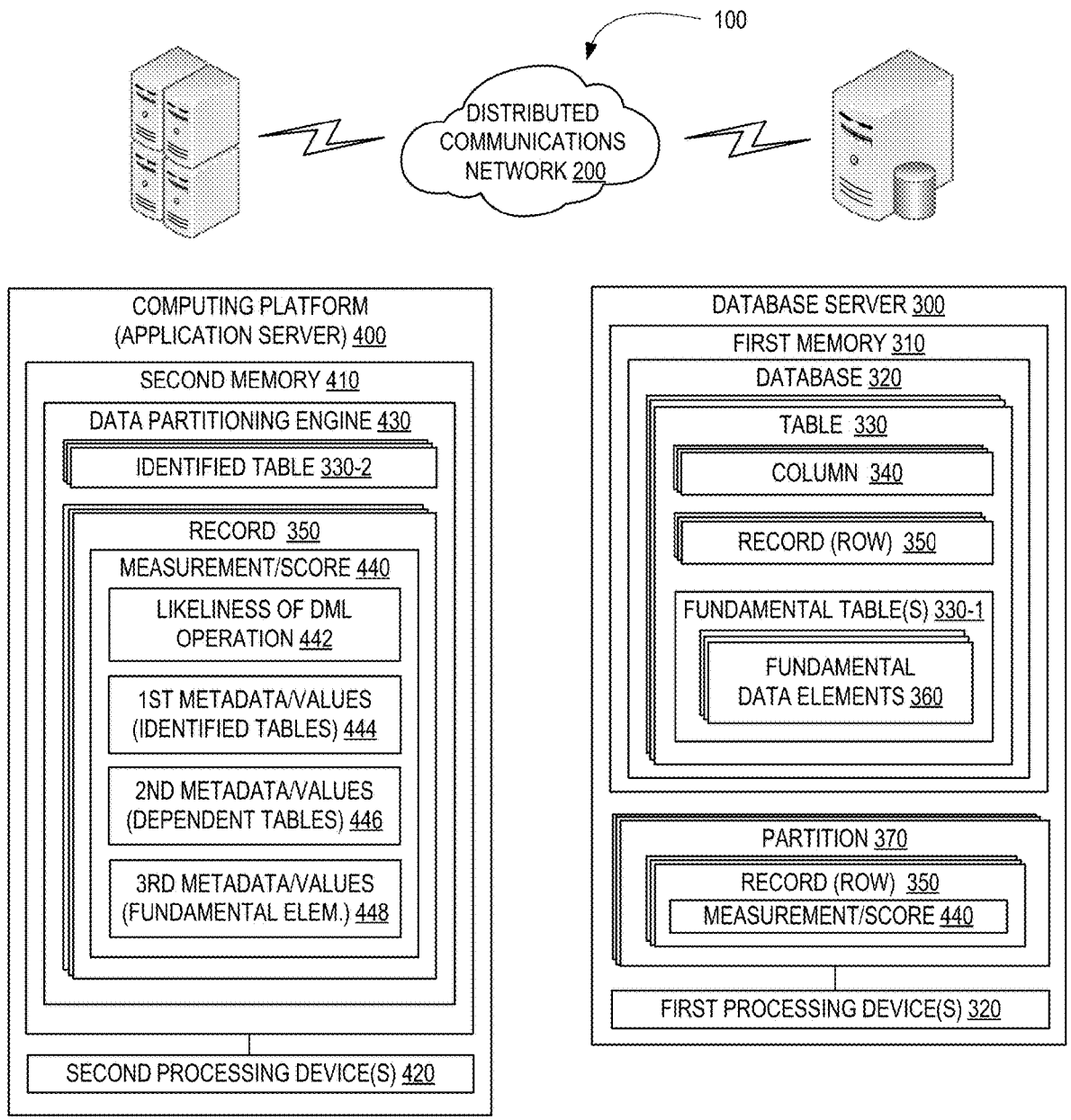
Figure 2:
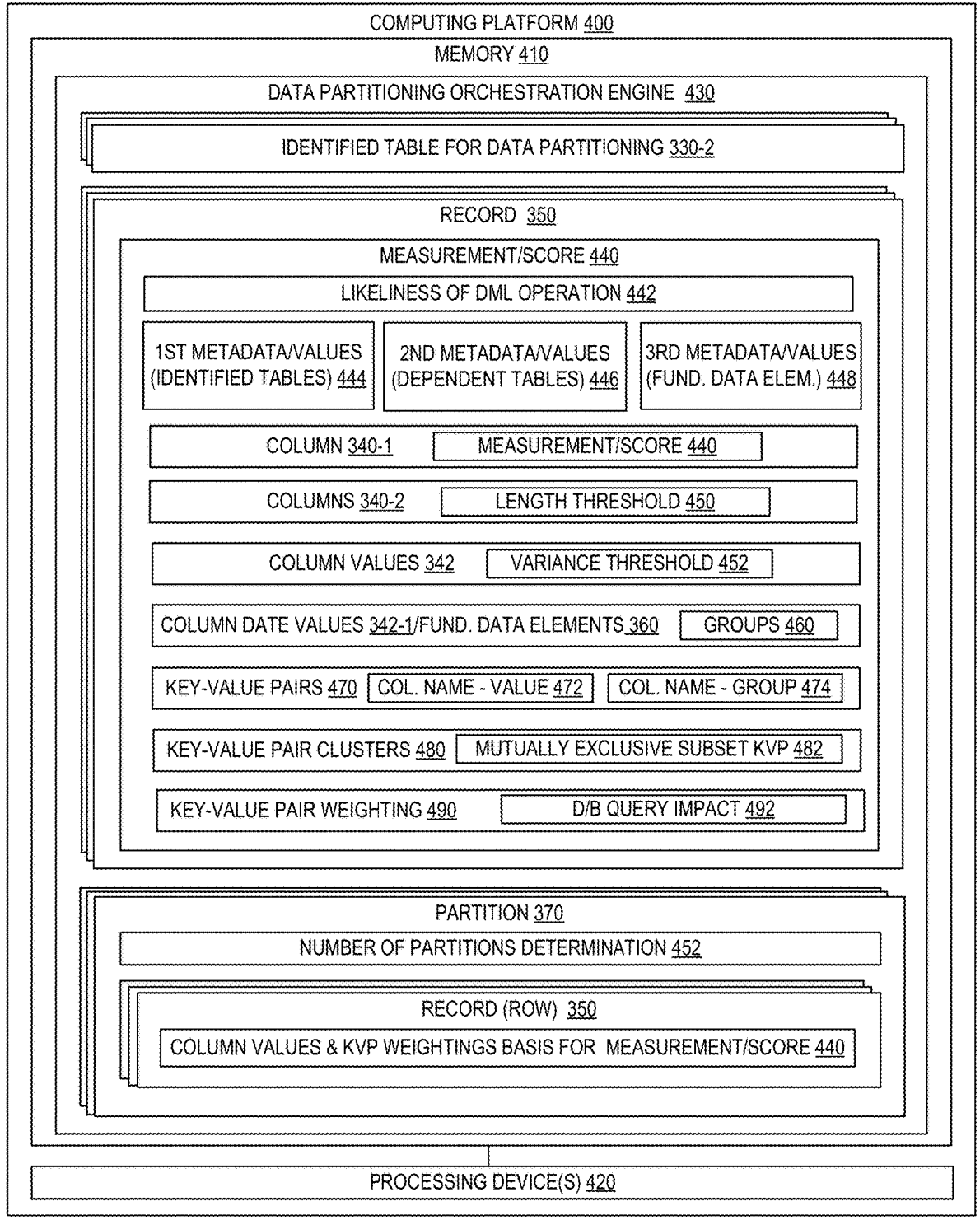
Figure 3:
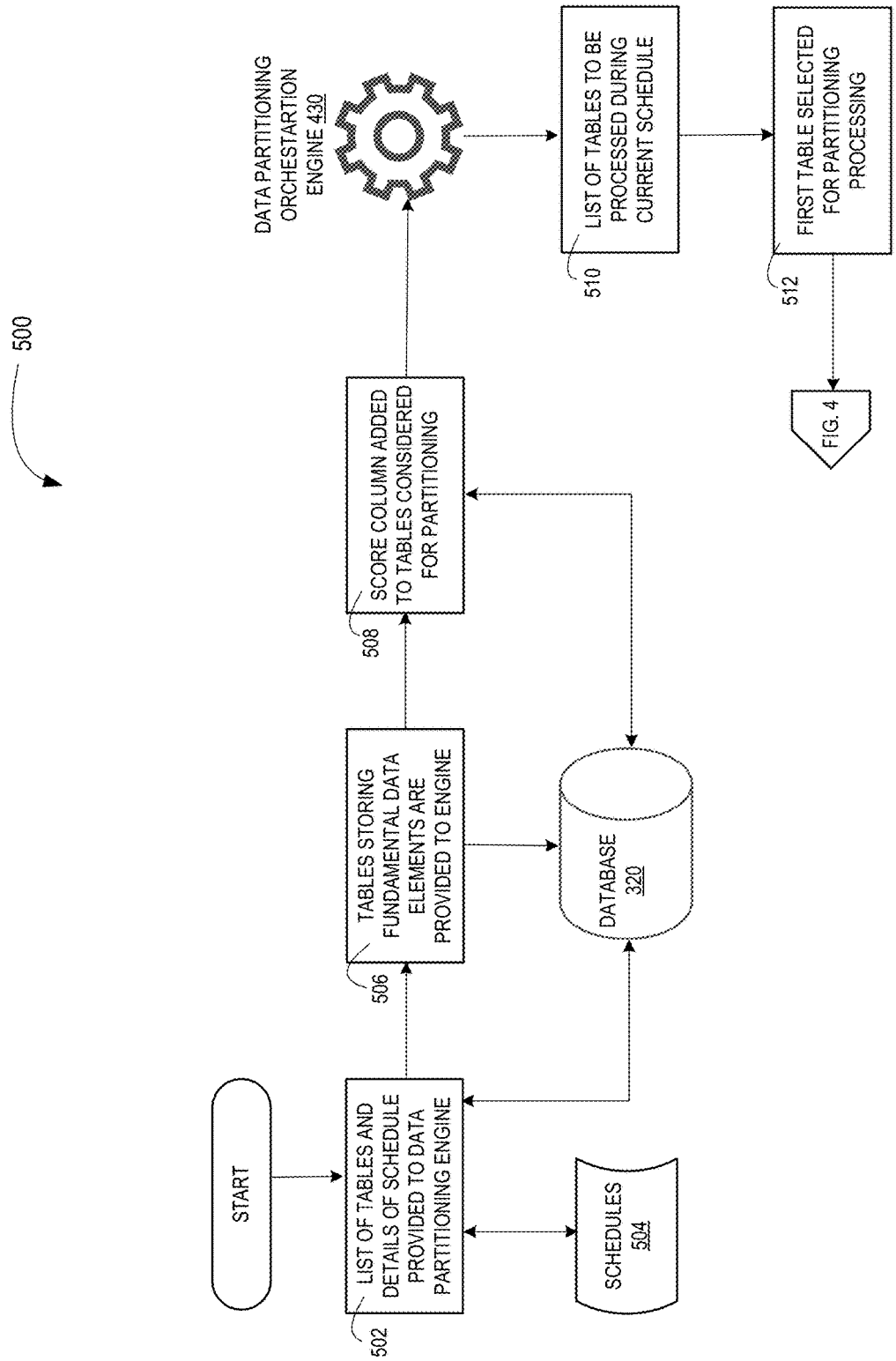
Figure 4:
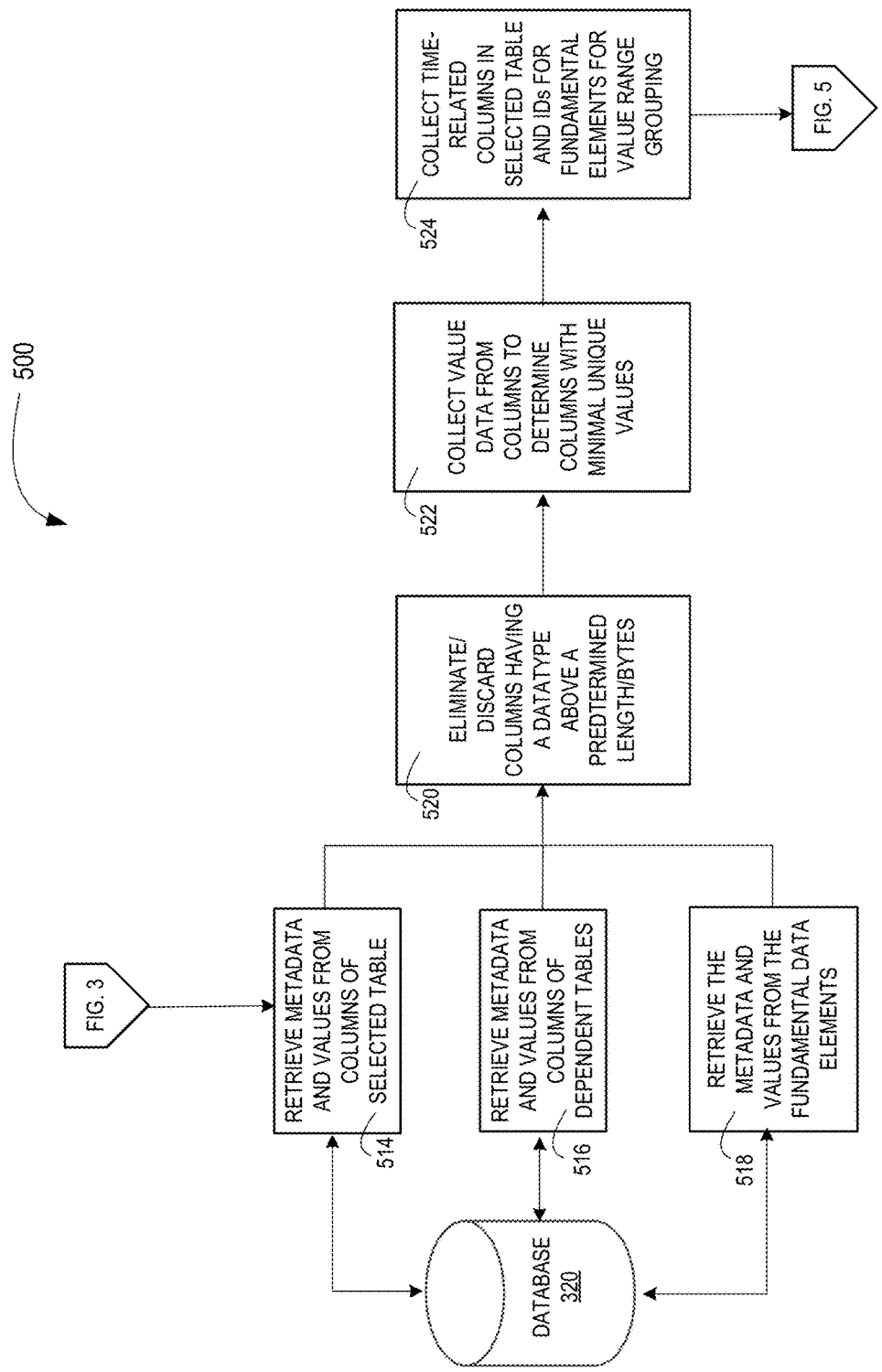
Figure 5:
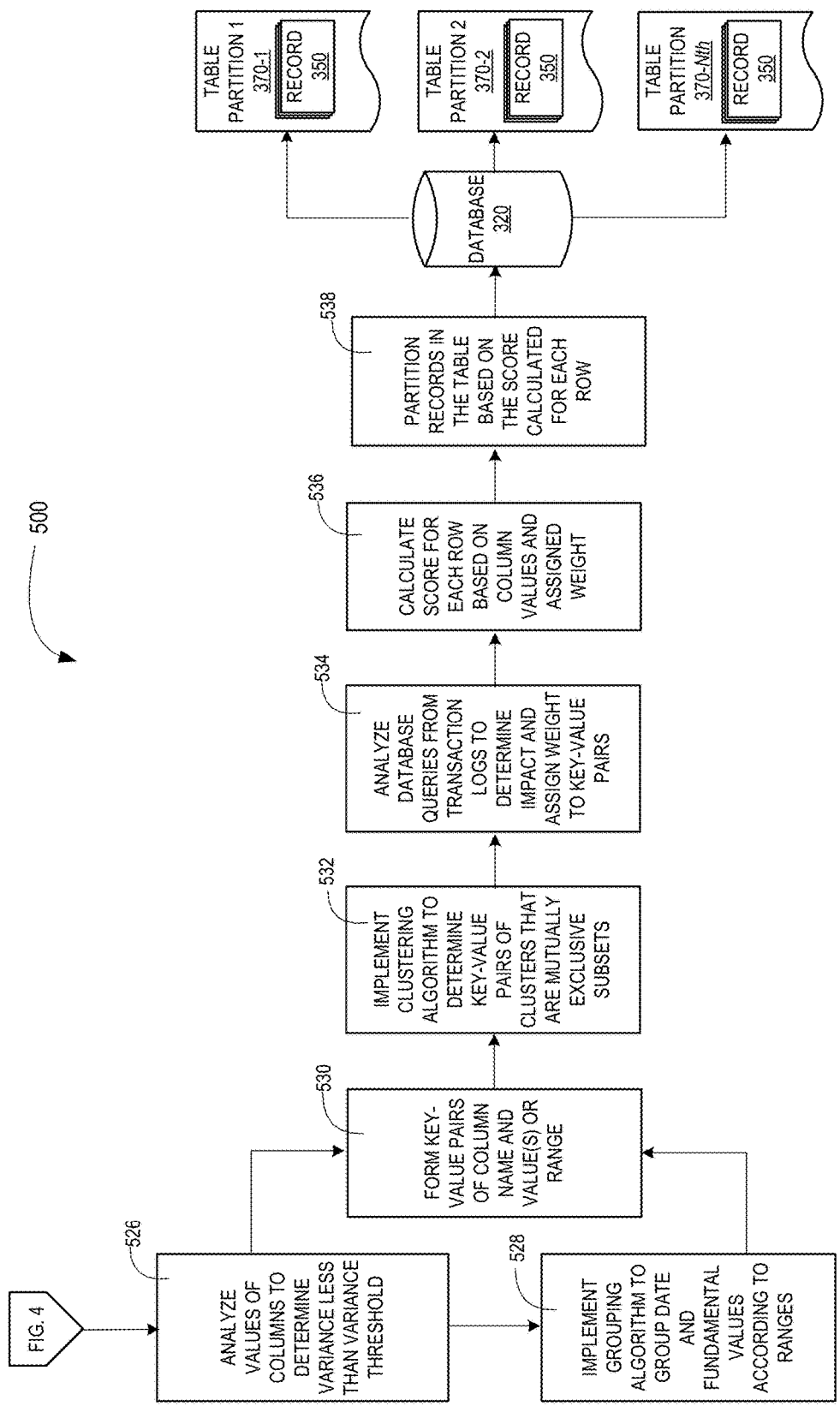
Figure 6:
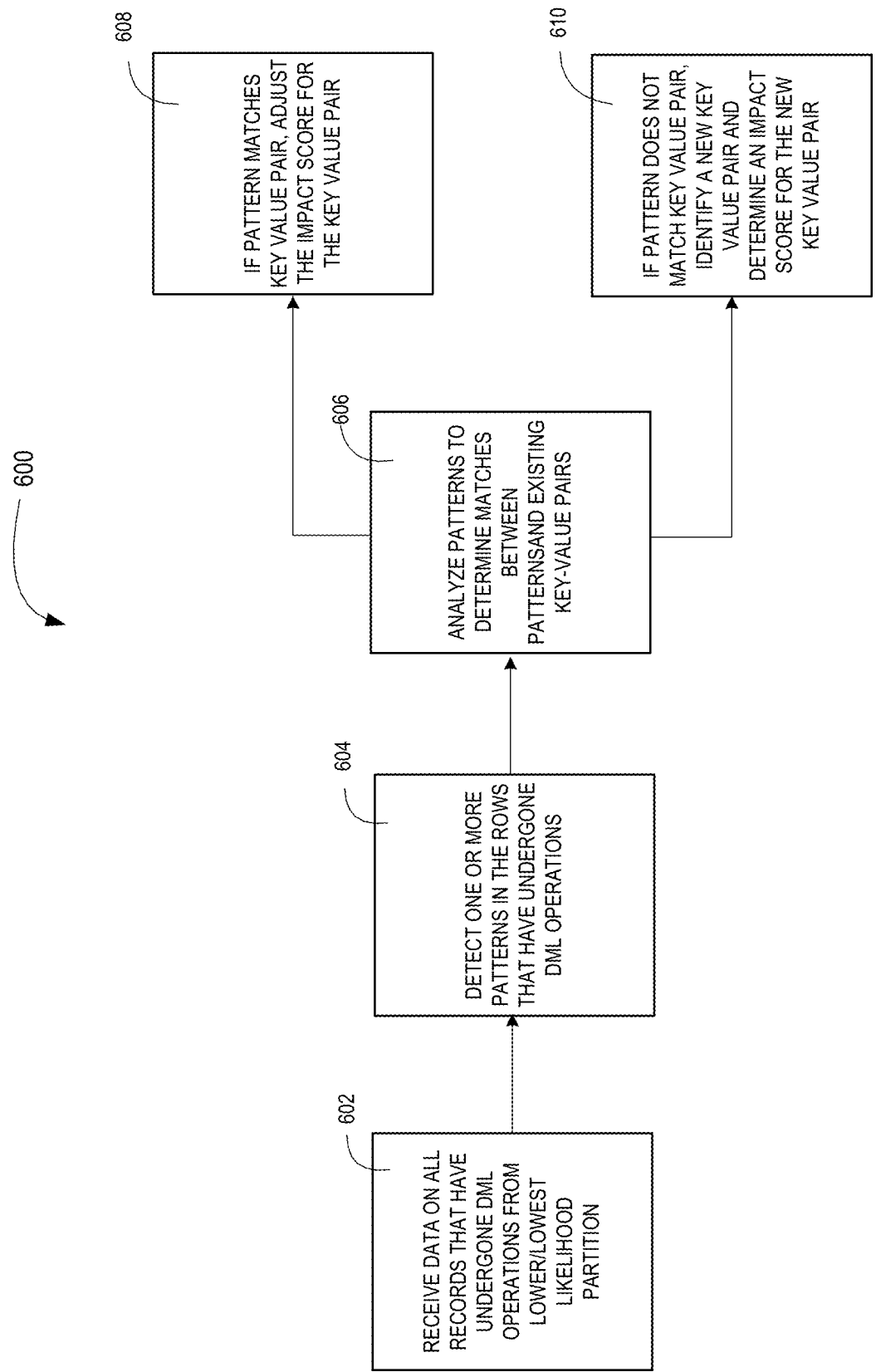
Figure 7:
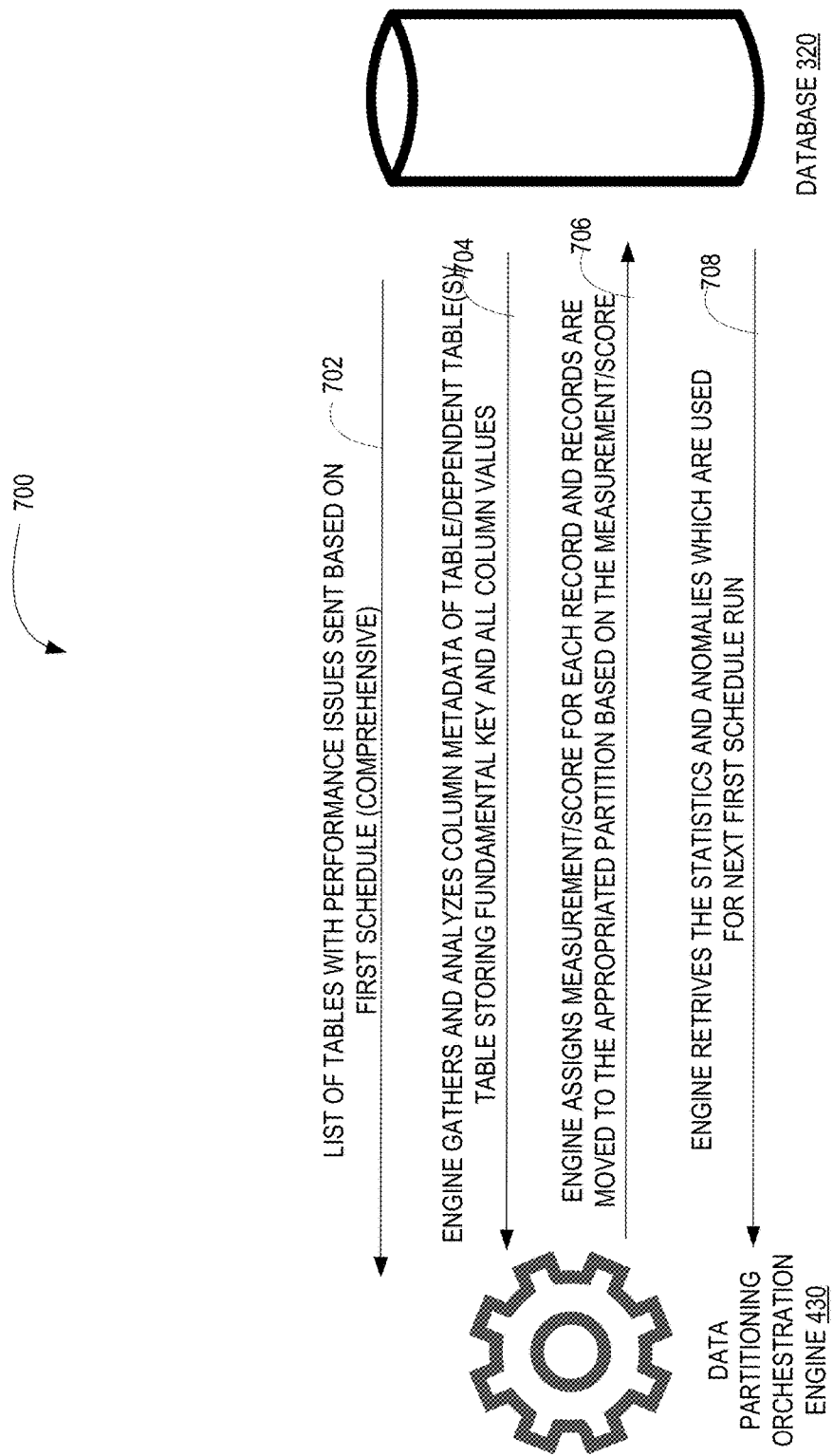
Figure 8:
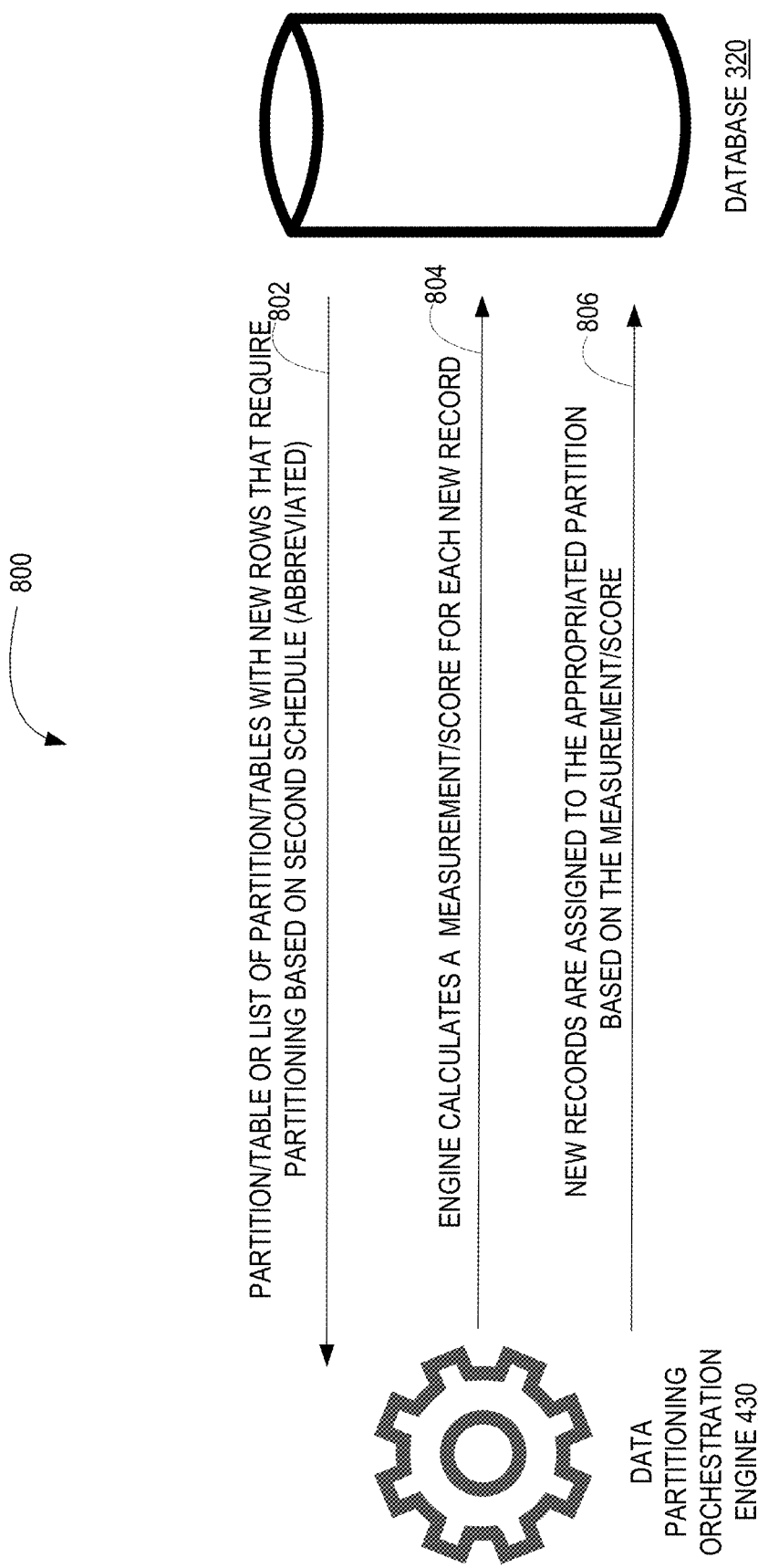
Figure 9:
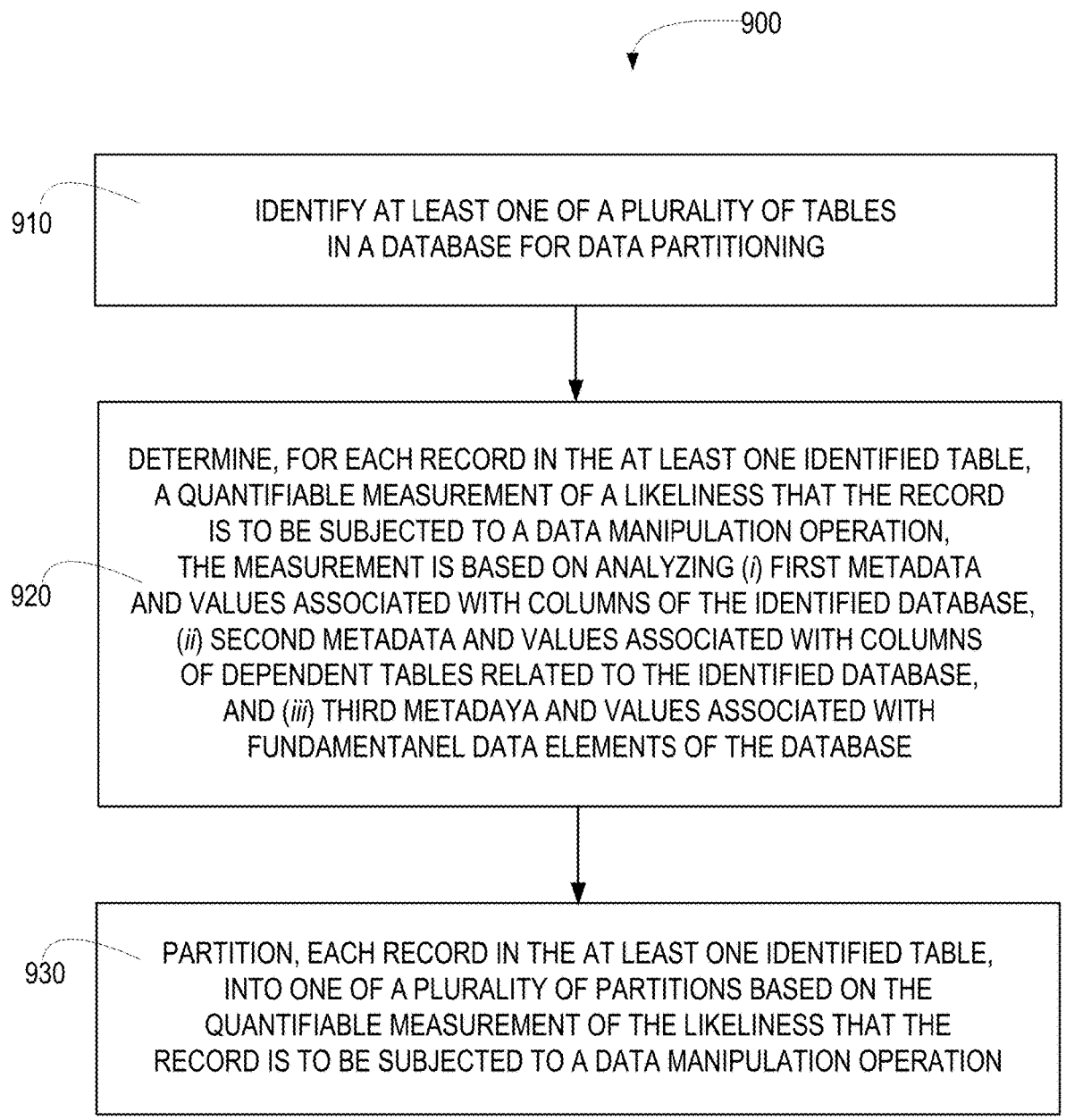

Having thus described embodiments of the invention in general terms, reference will now be made the accompanying drawings, wherein:

FIG. 1 is a schematic/block diagram of a system for intelligent data partitioning of database table for optimizing database performance, in accordance with embodiments of the present invention;

FIG. 2 is a schematic/block diagram of a computing platform including a data partitioning orchestration engine, in accordance with embodiments of the present invention;

FIGS. 3-5 are a flow diagram of methodology for intelligent data partitioning, in accordance with embodiments of the present invention;

FIG. 6 is a flow diagram of a method for identifying new key-value pairs or updating the impact score for existing key-value pairs based on data manipulation operations being performed on data records previously determined to have less likelihood of a data manipulation operation, in accordance with embodiments of the present invention;

FIG. 7 is a flow diagram of a method for re-assessment of records and potential data partition switching within a comprehensive schedule, in accordance with embodiments of the present invention;

FIG. 8 is a flow diagram of a method for assessment of new records and data partitioning placement of new records within an abbreviated schedule, in accordance with embodiments of the present invention; and FIG. 9 is a flow diagram of a method for intelligent data partitioning, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted, or unscripted programming language such as PYTHON, JAVA, PERL, SMALLTALK, C++, SPARK SQL, HADOOP HIVE or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" or "configured for" perform (or "configured for" performing) a certain function in a variety of ways, including, for example, by having one or more general-purpose circuits perform the function by executing particular computer-executable program code embodied in computer-readable medium, and/or by having one or more application-specific circuits perform the function.

Thus, as described in more detail below, embodiments of the present invention provide for intelligent analysis and prognosis-based data partitioning orchestration for optimizing database performance. As previously discussed, traditional partitioning mechanisms are analyzing metadata and values associated with the table being partitioned (i.e., partitioning keys established solely based on the columns of the table being partitioned). However, the present invention not only relies on metadata and values from the columns of the table being partitioned but also provides for analysis of dependent tables and the past behavior of fundamental data elements in the database as a means for determining how likely each record/row in the table is to be subjected to a data manipulation operation, such as data retrieval or any other operation performed on the record/row. The determination of how likely each record/row in the table is to be subjected to a data manipulation operation forms the criteria for partitioning, such that, in specific embodiments of the invention, data records that are more likely to be subjected to a data manipulation operation are moved to one partition, while data records that are less likely to be subjected to a data manipulation operation and moved to another partition.

Moreover, the present invention provides for systematically scheduling (i) re-assessment of previously partitioned data for purposes of possible partition re-assignment, and (ii) determination of partition assignment for new records according to the aforementioned intelligent data partitioning orchestration, such that data movement among partitions occurs seamlessly (i.e., avoiding partition switching while the database is undergoing data manipulation operations).

Further, embodiments of the present invention provide for partitioning to occur absent the need for a clearly defined partitioning key. In this regard, the present invention provides for determining key-value pairs within a table based on the metadata and values of columns in the table being partitioned, dependent table(s) and fundamental data elements in the database and analyzes database query inputs associated with the determined key-value pairs to assess the likelihood of a record being subjected to a data manipulation operation.

Turning now to the figures, FIG. 1 illustrates a system 100 for intelligent data partitioning of database tables, in accordance with embodiments of the invention. The system 100 is implemented in a distributed communication network 200, which may include the Internet, one or more intranets, one or more cellular networks or the like. The system 100 includes a database server 300 and a computing platform 400, such as an application server or the like. The database server 300 includes first memory 310 and one or more first processing devices 320 in communication with first memory 310. First memory 310 stores a database 320 which includes a plurality of tables 330 that comprise a plurality of columns 340 and a plurality of records (i.e., rows). At least one of the tables 330 is a fundamental table 330-1 that includes one or more fundamental data elements 360. Fundamental tables 330-1 within a database 320 are the most critical tables for an entity and are the center of a data model for the database 320. For example, in a financial institution database, the fundamental tables include account and customer tables and in an electronic commerce database, the fundamental tables include product, seller, and customer tables.

Computing platform 400 includes a second memory 410 and one or more second processors 420 in communication with second memory 410. Second memory 410 stores data partitioning orchestration engine 430 that is executable by the second processing devices 420 and is configured to provide intelligent data partitioning of tables within databases. Specifically, data partitioning orchestration engine 430 is configured to identify at least one of the tables 330-2 in the database 320 for data partitioning. In specific embodiments of the system, the tables 330-2 are identified based on performance issues associated with the table (e.g., slow query response time or the like).

Once the tables 330-2 have been identified, the data partitioning orchestration engine 430 is further configured to determine, for each record 350 in the identified table 330-2, a measurement/score 440 (otherwise referred to as a Database Manipulation Language (DML) score) of the likeliness that the record is to be subjected to a data manipulation operation 442, such data retrieval or the like. The measurement/score 440 is based on analyzing (i) first metadata and values 444 associated with the columns 340 in the identified table 330-2, (ii) second metadata and values 446 associated with dependent tables that are related to the identified table 330-2, and (iii) third metadata and values 448 associated with the fundamental data elements 360 in the fundamental table(s) 330-1. Dependent tables are tables which are interconnected to the identified table by sharing common data elements, such as through a foreign key relationship or the like.

As previously discussed by using data that is not only associated with the identified table 330-2 (i.e., dependent table data and fundamental data element data) the present invention is able to more accurately determine the likeliness that the record is to be subjected to a data manipulation operation.

Data partitioning orchestration engine 430 is further configured to partition the identified table 330-2 into a plurality of partitions 370 (i.e., a physically segregated location within the database 330) and assign each record 350 in the identified table 330-2 to one of the partitions 370 based on their respective measurement/score 440 indicating the likeliness of a data manipulation operation 442.

For example, in one specific embodiment of the invention, the measurement/score 440 may be an integer value between 1-10, where a measurement/score 440 of 1 indicates a record that is least likely to be subjected to a data manipulation operation and a measurement/score 440 of 10 indicates a record that is most likely to be subjected to a data manipulation operation. Further, according to the specific embodiment of the invention, the identified table 330-2 is partitioned in to two partitions 370; a first partition 370 that stores records 350 having a measurement/score 440 of 1-5 and a second partition 370 that stores records 350 having a measurement/score 440 of 6-10. Performance of the database/table is optimized since the majority of database manipulation operations will likely occur within the second partition 370 which stores less data than the overall pre-partitioned table. Partitioning the identified table 330-2 into two partitions is shown by way of example only. In this regard, the invention provides for the identified table 330-2 to be partitioned into any quantity of partitions, so as to optimize the performance of the database.

Referring to FIG. 2, a block diagram is depicted of a computing platform 400 configured for intelligent data partitioning, in accordance with various alternate embodiments of the invention. Computing platform 400, which may comprise one or more devices (e.g., application server(s) or the like), is configured to execute software programs, including engines, instructions, algorithms, modules, routines, applications, tools and the like. Computing platform 400 includes memory 410 and the like which may comprise volatile and non-volatile memory, such as read-only and/or random-access memory (RAM and ROM), EPROM, EEPROM, flash cards, or any memory common to computing platforms). Moreover, memory 410 and the like may comprise cloud storage, such as provided by a cloud storage service and/or a cloud connection service.

Further, computing platform 400 also includes at least one processing device 420, which may be an application-specific integrated circuit ("ASIC"), or other chipset, logic circuit, or other data processing device configured to execute stored software/firmware including data partitioning orchestration engine 430 or the like. Processing device(s) 420 or the like may execute one or more application programming interface (APIs) (not shown in FIG. 2) that interface with any resident programs, such as data partitioning orchestration engine 430 or the like stored in the memory 410 of the computing platform 400 and any external programs. Processing device (s) 420 may include various processing subsystems (not shown in FIG. 2) embodied in hardware, firmware, software, and combinations thereof, that enable the functionality of computing platform 400 and the operability of computing platform 400 on distributed communications network 200 (shown in FIG. 1). For example, processing subsystems allow for initiating and maintaining communications and exchanging data with other networked devices, such as database server 300 (shown in FIG. 1). For the disclosed aspects, processing subsystems of computing platform 400 may include any processing subsystem used in conjunction with data partitioning orchestration engine 430 and related engines, tools, routines, sub-routines, algorithms, sub-algorithms, sub-modules thereof.

Computing platform 400 additionally includes a communications module (not shown in FIG. 2) embodied in hardware, firmware, software, and combinations thereof, that enables electronic communications between computing platform 400 and other network devices, such as, but not limited to, database server 300. Thus, communication module may include the requisite hardware, firmware, software and/or combinations thereof for establishing and maintaining a network communication connection with one or more network devices.

Memory 410 stores data partitioning orchestration engine 430, which, as described in relation to FIG. 1, is configured to intelligently perform data partitioning to optimize performance within a database.

Specifically, data partitioning orchestration engine 430 is configured to identify one or more tables 330-2 for data partitioning. The identification of the table(s) 330-2 may occur by user input or the engine 440 (or some other engine/application in communication with the engine 440) may identify/determine table(s) experiencing performance issues (e.g., slow query response times or the like).

Data partitioning orchestration engine 330 is further configured to determine, for each record 350 in the identified table 330-2, a measurement/score 440 of the likeliness that the record is to be subjected to a data manipulation operation 442, such data retrieval or the like. As previously discussed, the measurement/score 440 is based on analyzing (i) first metadata and values 444 associated with the columns 340 in the identified table 330-2, (ii) second metadata and values 446 associated with dependent tables that are related to the identified table 330-2, and (iii) third metadata and values 448 associated with the fundamental data elements 360 in the fundamental table(s) 330-1.

Specifically, as illustrated in the flow diagrams of FIGS. 3-5 and discussed in detail infra., once table(s) 330-2 have been identified for data partitioning, data partitioning orchestration engine 330 is configured to add a column 340-1 (i.e., a DML score column or the like) to the identified table(s) 330-2 that is configured to receive entries of the subsequently determined measurement/score 440. Once the first, second and third metadata/values 442, 444, and 446 have been fetched from their respective tables, data partitioning orchestration engine 430 is configured to discard/eliminate columns 340-2 from further processing (i.e., key-value pair formation and analysis) that have a length greater than a predetermined length threshold 450. For example, columns that are configured to store user comments, image data or data types such as binary large object (BLOB) data, character large object (CLOB) data, Varchar max (i.e., variable size string data), nvarchar (i.e., variable length field data) or the like are excluded from further processing.

Further, data partitioning orchestration engine 330 is configured to determine data for key-value pair 470 consideration by determining which columns 340 have column values 342 with variance below a predetermined variance threshold 452 (i.e., which columns have values that hold a minimum number of unique values). For example, a column that stores names will high degree of variance since most names are unique, while a column that stores a status indicator will likely have a low degree of variance if the status only provides for minimal status options. Columns 340 having a variance greater than the predetermined variance threshold 452 are eliminated from key-value pair 470 consideration. In addition, data partitioning orchestration engine 330 is configured to implement one or more grouping algorithms to form groups 460 defined by a specific time range for columns 340 having date/time-related values 342-1 (e.g., timestamp, date, datetime or the like) or unique identifiers for fundamental data elements 360. In response to determining columns 340 having a variance below the variance threshold 452 and grouping date-related values 342-1 and fundamental data elements 360, data partitioning orchestration engine 330 is configured to form key-value pairs 472 comprising a column name/value(s) 472 or column name/grouping 474.

Moreover, data partitioning orchestration engine 330 is configured to pare down the listing of key-value pairs 470 to be considered for likeliness of a data manipulation operation by implementing one or more clustering algorithms to determine which key-value pair from a resulting cluster 480 is a mutually exclusive subset 482. Once the list of key-value pairs 470 have been pared down, the data partitioning orchestration engine 330 is configured to assign the key-value pairs a weight 490 (i.e., an impact score/weight) by analyzing the database input queries in the transaction log to determine the impact of the key-value values on the queries (i.e., the larger the impact the higher the weight 490). Subsequently, data partitioning orchestration engine 330 is configured to calculate the measurement/score 440 for each record 350 by based on the column values in specified row and the key-value pair weights.

As previously discussed, data partitioning orchestration engine 430 is further configured to partition the identified table 330-2 into a plurality of partitions 370 (i.e., a physically segregated location within the database 330) and assign each record 350 in the identified table 330-2 to one of the partitions 370 based on their respective measurement/score 440 indicating the likeliness of an occurrence of a data manipulation operation 442.

Referring to FIGS. 3-5 a flow diagram is presented of a methodology 500 for intelligent data partitioning of tables within database, in accordance with embodiments of the present invention. At Event 502, a list of tables and details of a schedule(s), as provided from schedule repository 504, are provided to the data partitioning orchestration engine. The details of the schedule(s) may include timing for when the schedule should be initiated (i.e., when the engine should be executed) and where the mechanism for partitioning should be used. At Event 506, tables in database 320, which store fundamental data elements are identified and are provided to the data partitioning orchestration engine. As previously discussed, fundamental tables are the most critical tables for an entity and are the center of a data model for the database. For example, in a financial institution database, the fundamental tables include account and customer tables and in an electronic commerce database, the fundamental tables include product, seller, and customer tables.

At Event 508, a new column (i.e., a measurement/score column) is added to each table in the database that is being considered for partitioning. As previously discussed, the new column is configured to store measurement/score (e.g., DML score) entries for each row of the table.

At Event 510, the data partitioning engine 430 is configured to determine a list of tables to be processed during the current schedule (i.e., the tables that are processed may vary based on whether the schedule is a comprehensive schedule partitioning or re-assessing the partitioning of records in tables or an abbreviated schedule partitioning new records). At Event 512, a first table from amongst the list of tables to be processed during the current schedule is selected.

Referring to FIG. 4, in which a comprehensive schedule is executed to partition or re-assess each row in a table, at Events 514, 516, and 518, metadata and values are retrieved from the database 320 for respective columns of the selected table, columns of the dependent table(s) and fundamental data elements linked to the fields of the selected table or dependent table(s). The metadata includes, but is not limited to, schema, structure, data type, length, relationships and other information. The metadata of the columns of the selected table is used to identify both the dependent tables and the fundamental data elements.

At Event 520, columns having a data type in excess of a predetermined length threshold are eliminated/discarded from further processing. For example, columns that store user comment entries, images or other large data types are removed from further processing. In specific embodiments of the invention, columns that store data larger than 200 bytes in length are eliminated/discarded from further processing. At Event 522, value data is collected from the remaining columns to subsequently determine columns with a minimal threshold of unique values (i.e., highly repetitive values to be considered as part of a key-value pair). At Event 524, columns storing time-related values (e.g., timestamp, date, time/date) are identified in the selected table and the time-related value data is collected for subsequent grouping (i.e. groups defined by time/date ranges to be considered as part of key-value pair).

Referring to FIG. 5, at Event 526, the values of the columns are analyzed to determine which columns have a variance below a predetermined variance threshold (e.g., less than 0.5 variance or the like). Further, at Event 528, one or more grouping algorithms are implemented to group data values in time-related columns according to date/time ranges as determined by the grouping algorithm. At Event 530, key-value pairs are formed that consist of column name (key) and value (value) and column name (key) and group of values (value).

In order to reduce the number of key-value pairs that are determinative of a record's likeliness to undergo data manipulation operation(s), at Event 532, a clustering algorithm is implemented to cluster key-value pairs and select from each cluster one key-value pair which is a mutually exclusive subset.

At Event 534, distribution methodology is implemented to assign a weight to each of the remaining key-value pairs by analyzing the impact of the key-value pairs to input queries executed on the database (e.g., analyzing WHERE conditions and JOIN Conditions in the transaction logs). At Event 536, measurement/scores are calculated for each row in the selected table based on the column values and the weightage assigned to each column value.

At Event 538, each record in the table is partitioned into one of plurality of partitions based on the calculated measurement/score of the respective record. In the illustrated example shown in FIG. 5, the partitions comprise a finite number N of partitions, table Partition 1 370-1, table Partition 2 370-2, up to table Partition N 370-Nth. In specific embodiments of the invention, the number of partitions for a table is determined based on the number of records in the table, the variance in the measurements/scores and the like in order to further optimize the performance of the database.

As previously discussed, in specific embodiments of the invention a separate partition (e.g., Partition 0 or the like), is designated to store new records of a table that have yet to be assigned to a partition. In such embodiments of the invention, when the second/abbreviated schedule is executed only records from the separate partition are analyzed to determine their respective measurement/score of the likelihood of an occurrence of a data manipulation operation and subsequently assigned into a partition that correlates to their respective measurement/score. In other embodiments of the invention, in which a separate partition is not designated to store new records, new records may be added to one or more of the partitions and the measurement/score column may indicate a value of "null" or the like, which indicates that the new record has not yet undergone partitioning. When the second/abbreviated schedule is executed only those records in the partitions that indicate the "null" value are analyzed to determine their respective measurement/score of the likelihood of an occurrence of a data manipulation operation and subsequently assigned into a partition that correlates to their respective measurement/score.

Referring to FIG. 6, a flow diagram is depicted of a method 600 for adjusting key-value pair weights or adding new key-value pairs based on records in partition with lowest likelihood of data manipulation operations have been determined to have undergone to have undergone such operations, in accordance with embodiments of the present invention. At Event 602, data is received by the engine on all records that have undergone data manipulation operations and currently reside a lower or lowest likelihood of data manipulation operation partition. At Event 604, the data is analyzed by the engine to detect one or more patterns from amongst the records that have undergone a data manipulation operation and, at Event 606, pattern analysis is performed to determine matches between the patterns and existing key-value pairs. Events 604 and 606 are undertaken to analyze anomalies.

If a determination is made that a pattern matches an existing key-value pair, at Event 608, the weighting for the key-value pair is adjusted (e.g., the weighting is increased to reflect the fact that the record has undergone a data manipulation operation). If a determination is made that a pattern does not match a key-value pair, a new key-value pair is identified based on the analysis and a weighting is determined and assigned to the new key-value pair.

Referring to FIG. 7 a swim-lane flow diagram is depicted of a method 700 for intelligent data partitioning based on a comprehensive schedule, in accordance with embodiments of the invention. A comprehensive schedule, otherwise referred to herein as a first schedule, is executed on a periodic basis to initially assess or re-assess the measurement/score of the likelihood of a record undergoing a data manipulation operation and place the record in the proper partition based on the measurement/score. The need to implement the comprehensive schedule is based on the fact that, over time, the likelihood of a record undergoing a data manipulation operation may change. The comprehensive/ first schedule facilitates partition refresh mechanisms and avoids partition switching of records. At Event 702, the database 320 provides the engine 430, on the periodic interval defined by the schedule, with a list of tables with performance issues. At event 704, the engine gathers and analyzes column metadata of a selected table, dependent tables determined to be related to the selected table and fundamental data elements of the database and all the column values stored in such tables. As previously discussed, dependent tables are tables which are interconnected to the identified table by sharing common data elements, such as through a foreign key relationship or the like.

At Event 704, the engine assigns a measurement/score to each record in the table based on analysis and prognosis which indicates the likeliness of an occurrence of a data manipulation operation. Once a measurement score has been assigned, subsequent executions of the comprehensive schedule will re-assess and/or re-assign a measurement/ score to each record in the table based on the current (i.e., at the time of the subsequent execution) likeliness of an occurrence of a data manipulation operation. Based on the measurement/score the records are partitioned into respect partitions that correspond to a measurement score or grouping of measurement/scores.

At Event 706, the engine retrieves statistics and anomalies from the database that are used in the next scheduled execution of the comprehensive schedule.

Referring to FIG. 8 a swim-lane flow diagram is depicted of a method 700 for intelligent data partitioning based on an abbreviated schedule that partitions new records, in accordance with embodiments of the invention. At Event 802, the database 320 provides the engine 430 with a partition/table or list of partitions/tables with new rows that require partitioning based on an abbreviated schedule (otherwise referred to a second schedule). The new records may be stored in a partition designated only for new records (e.g., Partition 0 or the like) or new records may be stored in one or more standard partitions with the measurement/score column having a value of "null" which indicates that the record has yet to undergo partitioning. At Event 804, the engine 430 calculates, for each new record, a measurement/score indicating likeliness of an occurrence of a data manipulation operation. The calculation is based on key-value pair weightage assigned during the last-in-time execution of the first/comprehensive schedule. As such, the abbreviated schedule does not require the retrieval of metadata and values from the columns of the selected table, the dependent table(s) or the fundamental data elements, the formation of key-value pairs nor the assigning of weightage values to the key-value pairs. In response to calculating the measurement/score for each new record, at Event 806, the new records are assigned/moved to the appropriate partition that correlates their respective measurement score.

Referring to FIG. 9, a flow diagram is depicted of a method 900 for intelligent data partitioning, in accordance with embodiments of the present invention. At Event 910, at least one table in a database is identified for data partitioning. The table may be identified based on performance issues, such as slow query response time or the like. The identification of the table(s) may occur programmatically via software configured to determine performance issues in databases or a user may provide an input that identifies the table(s).

In response to identifying the tables, at Event 910, a measurement/score (e.g., Data Manipulation Language (DML) score or the like) is determined, for each record in the identified table(s). The measurement/score is based on analyzing (i) first metadata and values associated with the columns in the identified table, (ii) second metadata and values associated with dependent tables that are related to the identified table, and (iii) third metadata and values associated with the fundamental data elements in the fundamental table(s). As previously discussed, the metadata and values may be analyzed to determined key-value pairs comprising column name (key) and values or grouped values (value). Subsequently, distribution methodology is implemented to assign weighting values to each of the key-value pairs by analyzing the impact that each key-value pair has on input queries provided to the database and executed on the applicable table. The measurement/score for each row is calculated based on the column values and their applicable key-value pair weightings.

At Event 930, each record in the identified table(s) is partitioned into one of a plurality of partitions based on their respective measurement/score. For example, in one specific embodiment of the invention in which the measurement/score is an integer value between 1-10, the partitions may comprise two partitions, a first partition storing records having a measurement/score of 1-5 and a second partition storing records having a measurement/score of 6-10. In another specific embodiment of the invention, the partitions may comprise ten partitions, with each of the ten partitions storing records having a specific integer value measurement/score (e.g., first partition storing records having a measurement/score of 1, second partition storing records having a measurement/score of 2 and so on).

As previously discussed by using data that is not only associated with the identified table 330-2 (i.e., dependent table data and fundamental data element data) the present invention is able to more accurately determine the likeliness that the record is to be subjected to a data manipulation operation.

As evident from the preceding description, the systems, methods and the like described herein represents an improvement database management and, specifically, intelligent data partitioning orchestration within a database so as to optimize overall database performance. The data partitioning in the present invention is not limited to metadata and values associated with the columns table being partitioned nor does it rely traditional partitioning keys that are solely established based on columns in the table being partitioned. Instead, the present invention is able to determine the likelihood that a record occurs a data manipulation operation based on analyzing metadata and values from the selected table, dependent tables and fundamental data elements of the database to determine corresponding partition to assign to each record in the table. As a result, the invention is instrumental in allowing for databases storing large volumes of complex data to be intelligently partitioned for purposes of addressing database performance issues and minimizing the effects of partition switching.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for intelligent database partitioning, the system comprising:
   a database comprising a plurality of tables, each table comprising a plurality of columns and a plurality of records, wherein the plurality of tables includes one or more fundamental tables comprising fundamental data elements;
   a computing platform including a memory and one or processing devices in communication with the memory;
   a data partitioning orchestration engine stored in the memory, executable by the one or more processing devices on a first schedule and configured to, for an initial execution of the first schedule:
      identify at least one of the plurality of tables for data partitioning,
      determine, for each record in the at least one identified table, a measurement of a likeliness that the record is to be subjected to a data manipulation operation, wherein the measurement is based at least on analyzing (i) first metadata and values associated with the columns of the identified table, (ii) second metadata and values associated with columns of dependent tables related to the identified table, and (iii) third metadata and values associated with the fundamental data elements of the one or more fundamental tables,
      partition, each record in the at least one identified table, into one of a plurality of partitions based on the measurement of the likeliness that the record is to be subjected to a data manipulation operation,
   wherein the first partitioning engine is further configured to, for each subsequent execution of the first schedule after the initial execution:
      determine, for each record in the at least one identified table, an updated measurement of the likeliness that the record is to be subjected to a data manipulation operation, and determine whether each of the records in the at least one identified table should remain in their respective current partition or be re-assigned to a different partition based on the updated measurement of the likeliness that the record is to be subjected to a data manipulation operation.

2. The system of claim 1, wherein the data partitioning orchestration engine is further configured to be executed on a second schedule that is configured to:
   determine, for each new record having been entered into the table since a preceding execution, the measurement of the likeliness that the new record is to be subjected to a data manipulation operation, and
   partition each new record into one of the plurality of partitions based on the measurement of the likeliness that the new record is to be subjected to a data manipulation operation,
   wherein the second schedule is based on a shorter time period than the first schedule.

3. The system of claim 2, wherein the data partitioning orchestration engine is further configured to determine the time period for execution of the first and second schedules based at least on one or more of a volume of records in the identified table, a volume of new records in the identified table, and a volume of query transactions logged for the database.

4. The system of claim 1, wherein the data partitioning orchestration engine is further configured to:
   add an additional column to the at least one identified table, wherein the additional column is configured to store the measurement of the likeliness that the record is to be subjected to a data manipulation operation.

5. The system of claim 1, wherein the data partitioning orchestration engine is further configured to:
   determine a quantity of the plurality of partitions based at least on a quantity of records in the table and a variance amongst the measurements of each of the records in the table.

6. The system of claim 1, wherein the data partitioning orchestration engine is further configured to:
   insert new records entered into a designated partition from amongst the plurality of partitions, wherein the designated partition is configured to store only new records that have not yet undergone a determination of the measurement.

7. The system of claim 1, wherein the data partitioning orchestration engine is further configured to determine the measurement of the likeliness that the record is to be subjected to a data manipulation operation by:
   identifying a plurality of key-value pairs defined by (i) a column of the identified table, one of the dependent tables or one of the fundamental tables, and (ii) and a corresponding column value or predetermined time period range,
   analyzing, over time, one or more historical transaction logs associated with the database to determine a level impact that each of the key-value pairs has on queries executed on the database,
   assigning a weighting to each of the key-value pairs based on the level of impact that the corresponding key-value pair has on the queries executed on the identified table of the database, and
   determine the measurement of the likeliness that the record is to be subjected to a data manipulation operation based on column values and the weightage assigned to the key-value pairs.

8. The system of claim 7, wherein the data partitioning orchestration engine is further configured to identify the plurality of key-value pairs by:
   analyzing column values to determine which columns in the identified table, the one or more dependent tables and the one or more fundamental table include column values having a variance below a predetermined variance limit, wherein a first key-value pair is defined by (i) a column including column values having the variance below the predetermined variance limit and (ii) the corresponding column value,
   grouping time-specific columns according to time period ranges, wherein the time period ranges are determined based on a volume of records in a corresponding table, wherein a second key-value pair is defined by (i) a time-specific column, and (ii) the corresponding grouping, and
   executing a clustering algorithm on the first and second key-value pairs to form clusters of key-value pairs and determining which key-value pair from amongst each of key-value pairs forming a cluster is a mutually exclusive subset of the cluster, wherein the key-value pair that is the mutually exclusive subset of the cluster defines a key-value pair configured for impact scoring.

9. The system of claim 7, wherein the data partitioning orchestration engine is further configured to identify the plurality of key-value pairs by:
   eliminating columns from key-value pair consideration based on a predetermined data size limit for values stored in a column.

10. The system of claim 7, wherein the data partitioning orchestration engine is further configured analyze anomalies by:
    determining one or more patterns in data manipulation operations from data stored in at least one of the plurality partitions,
    analyzing the one or more patterns to determine whether the one or more patterns match a key-value pair,
    if at least one of the one or more patterns match a key-value pair, adjusting the impact score for the key-value pair, and
    if the one or more patterns do not match a key-value pair, identifying a new key-value pair and assign an impact score to the new key-value pair.

11. A computer-implemented method for intelligent database partitioning, the method is executed by one or more computing processor devices and comprising:
    for an initial execution of a first schedule for database partitioning:
        identifying at least one of a plurality of tables in a database for data partitioning;
        determining, for each record in the at least one identified table, a measurement of a likeliness that the record is to be subjected to a data manipulation operation, wherein the measurement is based at least on analyzing (i) first metadata and values associated with columns of the identified table, (ii) second metadata and values associated with columns of dependent tables related to the identified table, and (iii) third metadata and values associated with fundamental data elements of database;
        partitioning, each record in the at least one identified table, into one of a plurality of partitions based on the measurement of the likeliness that the record is to be subjected to a data manipulation operation;
    for each subsequent execution of the first schedule for database partitioning:

determining, for each record in the at least one identified table, an updated measurement of the likeliness that the record is to be subjected to a data manipulation operation; and determining whether each of the records in the at least one identified table should remain in their respective current partition or be re-assigned to a different partition based on the updated measurement of the likeliness that the record is to be subjected to a data manipulation operation.

12. The computer-implemented method of claim 11, further comprising:

for a second schedule for data partitioning:

determining, for each new record entered into the at least one identified table, the measurement of the likeliness that the new record is to be subjected to a data manipulation operation, and partitioning each new record into one of the plurality of partitions based on the measurement of the likeliness that the new record is to be subjected to a data manipulation operation, wherein the second schedule is based on a shorter time period than the first schedule.

13. The computer-implemented method of claim 11, further comprising:

in response to identifying the at least one of a plurality of tables in a database for data partitioning, adding an additional column to the at least one identified table, wherein the additional column is configured to store the measurement of the likeliness that the record is to be subjected to a data manipulation operation.

14. The computer-implemented method of claim 11, further comprising:

inserting new records entered into a designated partition from amongst the plurality of partitions, wherein the designated partition is configured to store only new records that have not yet undergone a determination of the measurement.

15. A computer program product including a non-transitory computer-readable medium that comprises:

a first set of codes for causing a computer to identify at least one of a plurality of tables in a database for data partitioning;

a second set of codes for causing a computer to determine, for each record in the at least one identified table, a measurement of a likeliness that the record is to be subjected to a data manipulation operation, wherein the measurement is based at least on analyzing (i) first metadata and values associated with columns of the identified table, (ii) second metadata and values associated with columns of dependent tables related to the identified table, and (iii) third metadata and values associated with fundamental data elements of database;

a third set of codes for causing a computer to partition, each record in the at least one identified table, into one of a plurality of partitions based on the measurement of the likeliness that the record is to be subjected to a data manipulation operation;

a fourth set of codes for causing a computer to determine for each record in the at least one identified table, an updated measurement of the likeliness that the record is to be subjected to a data manipulation operation; and a fifth set of codes for causing a computer to determine whether each of the records in the at least one identified table should remain in their respective current partition or be re-assigned to a different partition based on the updated measurement of the likeliness that the record is to be subjected to a data manipulation operation, wherein the first, second and third set of codes are executed on an initial execution of a first schedule for database partitioning and the fourth and fifth set of codes are executed on each subsequent execution of the first schedule after the initial execution.

16. The computer program product of claim 15, wherein the computer-readable medium further comprises:

a sixth set of codes for causing a computer to determine for each new record entered into the at least one identified table, the measurement of the likeliness that the new record is to be subjected to a data manipulation operation, and a seventh set of codes for causing a computer to partition each new record into one of the plurality of partitions based on the measurement of the likeliness that the new record is to be subjected to a data manipulation operation, wherein the sixth and seventh set of codes are executed on a second schedule for data partitioning and the second schedule is based on a shorter time period than the first schedule.

17. The computer program product of claim 15, wherein the computer-readable medium further comprises:

a sixth set of codes for causing the computer to, in response to identifying the at least one of a plurality of tables in a database for data partitioning, add an additional column to the at least one identified table, wherein the additional column is configured to store the measurement of the likeliness that the record is to be subjected to a data manipulation operation.

* * * * *